Patented Feb. 5, 1924.

1,482,741

UNITED STATES PATENT OFFICE.

PAUL MILLER GIESY, OF PLAINFIELD, NEW JERSEY, ASSIGNOR TO E. R. SQUIBB AND SONS, OF NEW YORK, N. Y., A CORPORATION OF NEW YORK.

DENTIFRICE MATERIAL.

No Drawing.     Application filed August 18, 1922. Serial No. 582,832.

*To all whom it may concern:*

Be it known that I, PAUL MILLER GIESY, a citizen of the United States, residing at Plainfield, in the county of Union, State of New Jersey, have invented certain new and useful Improvements in Dentifrice Materials; and I do hereby declare the following to be a full, clear, and exact description of the invention, such as will enable others skilled in the art to which it appertains to make and use the same.

This invention relates to dentifrices and more particularly to a material which may be utilized as a solvent for mucin in the oral cavity.

It is now well known that many diseases of the mouth and teeth are directly attributable to the accumulation of mucin. This substance is present in saliva and is deposited upon the teeth. By evaporation of water the mucin is converted into a gelatinous coating which adheres closely and is not readily removed by brushing the teeth with ordinary dentifrices. The mucin coating forms a lodging place for food particles and bacteria and leads to decay of the teeth and attendant unhealthy conditions.

The removal of the film of mucin from the teeth has been attempted heretofore, and various suggestions for the accomplishment of this desirable object have been suggested. Some of these, such as the use of hard abrasives, result in scratching the enamel of the teeth and aggravate rather than avoid the undesirable conditions. The use of solvents has also been suggested but the solvents recommended are either useless or not well adapted for contact with the delicate membranes of the mouth.

It is the object of the present invention to provide a dentifrice material which acts as a solvent for mucin and as an antiseptic, and which may be freely used, being harmless and inexpensive.

Further objects and advantages of the invention will be apparent as it is better understood by reference to the following specification in which the preferred embodiments are described. The details of ingredients and proportions are those best adapted for the purpose, and it is understood that these may be varied within wide limits.

It has been discovered that mucin is soluble in certain mildly alkaline solutions. Ordinary alkalies are not suitable, owing to their destructive and disagreeable effect upon the tissue of the oral cavity. Sodium biborate (tetraborate) ($Na_2B_4O_7$) is, however, a mild alkali having the correct degree of alkalinity to effect the solution of mucin without the destructive or disagreeable characteristics of the stronger alkalies, and it is, moreover, an antiseptic and tends to inhibit the growth of bacteria. Sodium biborate is, therefore, admirably adapted for the purpose of the invention.

To impart to the sodium biborate solution a pleasant saline taste without interfering with the alkalinity of the solution, it is desirable to include a neutral or nearly neutral salt of non-toxic character and pleasant taste. Sodium chloride (NaCl) is preferred for this purpose, but other salts such as potassium or sodium chlorate or sodium citrate may be mixed with the sodium biborate. Flavoring materials such as essential oils may be added to make the solution more pleasant to the taste.

The dentifrice material may be prepared in tablet form or as powder or granules. It may be dissolved in water by the user or prepared as a solution. It may be combined with other dentifrices, such as precipitated chalk or soap in the form of paste, powder or soap, or with liquid dentifrices.

Primarily the dentifrice material is intended for use as a wash. Preferably it is dissolved in water in the proper proportions and is used to rinse the mouth and teeth. When used in this manner it will dissolve mucin, and if used frequently will prevent accumulation thereof on the teeth. When combined with other dentifrices it may be used as a wash or may be applied to the teeth with a brush in the usual manner.

As an example of the invention, 85 parts by weight of sodium chloride are thoroughly mixed with 100 parts by weight of crystallized sodium biborate ($Na_2B_4O_7 10H_2O$). When these proportions of the ingredients are dissolved in 10,000 parts by weight of water a 1% solution of sodium biborate in a vehicle of physiological salt solution is provided which is suitable for the purpose of the invention. The proportions stated are preferred merely and may be varied within wide limits.

Preferably the material is supplied in the form of tablets containing sodium biborate in the proportions stated and of sufficient size to provide a 1% sodium biborate solution when the tablet is dissolved in approximately a third of a glass of water. This provides a sufficient amount of the solution for ordinary application. Stronger or weaker solutions may be used as desired.

The same relative proportions of sodium biborate and sodium chloride or other salt may be maintained when the material is combined with other dentifrices. The proportion of the material to be combined with such dentifrices may be varied at will, keeping in mind the purpose of the invention and the necessity of including a sufficient quantity of the material to accomplish its purpose.

Among the advantages of the invention are its inexpensive ingredients, the ease with which it may be dissolved as required, the solvent effect on the mucin and the mild and non-toxic character of the ingredients which cannot harm the tissue or the teeth.

I claim:—

1. A dentifrice material containing sodium biborate and sodium chloride in proportion so that when 185 parts by weight of the dentifrice is dissolved in 10,000 parts by weight of water a 1% solution of sodium biborate in a physiological salt solution is formed.

2. A dentifrice material containing approximately 100 parts by weight of sodium biborate and approximately 85 parts by weight of sodium chloride.

3. A dentifrice material containing approximately 100 parts by weight of sodium biborate and approximately 85 parts by weight of sodium chloride in tablet form adapted to be dissolved in water to provide a wash.

In testimony whereof I affix my signature.

PAUL MILLER GIESY.